(12) United States Patent
Bacher et al.

(10) Patent No.: US 7,291,001 B2
(45) Date of Patent: Nov. 6, 2007

(54) DEVICE FOR PREPARING PLASTICS MATERIAL

(75) Inventors: Helmut Bacher, St. Florian (AT); Helmuth Schulz, Linz (AT); Georg Wendelin, Linz (AT); Klaus Feichtinger, Linz (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 60 days.

(21) Appl. No.: 10/547,899

(22) PCT Filed: Feb. 2, 2005

(86) PCT No.: PCT/AT2005/000031

§ 371 (c)(1),
(2), (4) Date: Sep. 8, 2005

(87) PCT Pub. No.: WO2005/087474

PCT Pub. Date: Sep. 22, 2005

(65) Prior Publication Data

US 2006/0093696 A1    May 4, 2006

(30) Foreign Application Priority Data

Mar. 17, 2004    (AT) ................................ A 466/2004

(51) Int. Cl.
 *B02C 13/16*    (2006.01)
 *B02C 18/12*    (2006.01)
 *B02C 18/22*    (2006.01)
 *B29C 47/10*    (2006.01)

(52) U.S. Cl. ................... 425/202; 241/186.5; 366/186; 366/314; 366/316; 425/203; 425/204; 425/205

(58) Field of Classification Search ............... 425/202, 425/203, 204, 205; 366/186, 314, 315, 316; 241/186.5
See application file for complete search history.

(56) References Cited

U.S. PATENT DOCUMENTS

| 5,783,225 A * | 7/1998 | Bacher et al. .............. 425/202 |
| 6,719,454 B1 * | 4/2004 | Bacher et al. .............. 366/314 |
| 6,883,953 B1 * | 4/2005 | Bacher et al. ............. 366/76.1 |
| 7,137,802 B2 * | 11/2006 | Bacher et al. .............. 425/217 |

FOREIGN PATENT DOCUMENTS

| DE | 2432345 A | 1/1976 |
| DE | 2844164 A | 4/1980 |
| EP | 0625373 A2 | 11/1994 |
| WO | WO 00/74912 A1 | 12/2000 |
| WO | WO 03/103915 A1 | 12/2003 |

* cited by examiner

*Primary Examiner*—Robert Davis
*Assistant Examiner*—Joseph Leyson
(74) *Attorney, Agent, or Firm*—Townsend and Townsend and Crew, LLP

(57) ABSTRACT

A device for the preparation of plastics material, in particular thermoplastic plastics material, has a receiving container (1) for the material, the interior of the receiving container (1) having tools (21) provided therein which are arranged on a carrier disc (9). The tools are driven by a shaft (4) for rotation about the, in particular vertical, axis (8) of the shaft (4). At least one screw (17) is provided for the removal of the material out of the receiving container (1). The screw housing (16) has a feed opening (27) which is connected with respect to flow to a discharge opening (15) in the container (1), which discharge opening (15) is situated at a lower level than the carrier disc (9) and the tools (21) carried by it. Further moved tools (12), which convey the material into the discharge opening (15), are provided in the receiving container (1) below the carrier disc (9). The carrier disc (9) comprises at least one aperture (36) which connects the space (26) above the carrier disc to the space (10) below it, in order to divert water vapor and/or gaseous substances out of the space (10). The apertures (36) are situated close to the axis (8) and close to the trailing edges (37) of the tools (21) during the rotation of the carrier disc (9).

13 Claims, 3 Drawing Sheets

DEVICE FOR PREPARING PLASTICS MATERIAL

This application is the National Stage of International Application PCT/AT05/00031 filed on Feb. 2, 2005.

BACKGROUND OF THE INVENTION

The invention relates to a device for the preparation of plastics material, in particular thermoplastic plastics material, with a receiving container for the material to be treated, the interior of the receiving container having tools provided therein which are arranged on a carrier disc and which are driven by a shaft inserted into the interior for rotation about the, in particular vertical, axis of the shaft, and with at least one screw for removing the material out of the receiving container, the screw housing having a feed opening which is connected with respect to flow to a discharge opening in the receiving container, which discharge opening is situated at a lower level than the carrier disc and the tools carried by it, and further moved tools which convey the material into the discharge opening being provided in the receiving container below the carrier disc.

device of this type, known from WO 00/74912 A1, has proved highly successful for the preparation of plastics material, in particular thermoplastic plastics material, but it has been found that a blocking-in of the volatile substances released by the treated material occasionally occurs in the space below the carrier disc. It is not always possible for these volatile substances to escape upwards through the annular gap existing between the edge of the carrier disc and the inner wall of the receiving container, particularly since the material to be treated passes downwards from above through the annular gap. It is particularly undesirable if the volatile substances are removed with the treated material out of the receiving container and arrive in the extruder which is attached directly or indirectly to the receiving container, since there is then a risk that inclusions of gas of various types will be present in the extruded material, and this substantially reduces the quality of the material contained at the outlet of the extruder. This risk cannot be entirely eliminated even by a degassing device generally provided in the extruder. In addition, volatile substances of this type cannot generally be prevented from the beginning, since they are water vapor, separation products of the material to be treated, gaseous or evaporated portions of coolant, etc. In particular, in the case of moist plastics material introduced into the receiving container, these volatile substances can be substantial.

SUMMARY OF THE INVENTION

An object of the present invention is to avoid these drawbacks and, with little outlay, to make the material removed through the discharge opening of the receiving container at least substantially free of the volatile substances mentioned above. This object is attained according to the invention in that the carrier disc comprises at least one aperture which is situated close to the axis and close to the trailing edges of the tools during the rotation of the carrier disc and which connects the space above it to the space below it. By means of the aperture, the volatile substances present in the space below the carrier disc or at least formed there can escape upwards through the carrier disc into the space above it, where they are harmless and from where they can escape if necessary. In this case, it has been found from tests that apertures situated close to the axis are more effective than apertures situated at a distance from the axis.

Such apertures situated at a distance from the axis are known from EP 625.373 A2 or DE 28 44 164 A, but are used there for the passage of crushed materials from the space above the disc to the space below it. In contrast thereto, the apertures according to the invention situated close to the trailing edges of the tools during the rotation of the carrier disc make use of the suction effect produced by the rotating tools in order to draw away the aforesaid volatile substances out of the space below the carrier disc.

In accordance with a further development of the invention, it is advantageous for at least one of the apertures to be constructed with walls which extend at an inclination to the direction of the axis and to the plane of the carrier disc. This tends to prevent material present in the space above the disc from dropping down through the carrier disc. A similar effect can be achieved within the scope of the invention by a cover which is provided for at least one of the apertures and which covers the aperture all around apart from an opening directed towards the periphery of the carrier disc.

The size of the apertures depends upon the quantity of the volatile substances to be removed. It has been found by tests that it is sufficient for the cross-sectional area of all the apertures to be made at most as large as the cross-sectional area of all the screws of an extruder connected with respect to flow to the discharge opening of the receiving container.

Further characterizing features and advantages of the invention may be seen in the description of embodiments of the subject of the invention, which are illustrated diagrammatically in the drawing.

DESCRIPTION OF THE PREFERRED EMBODIMENTS

Figure 1:
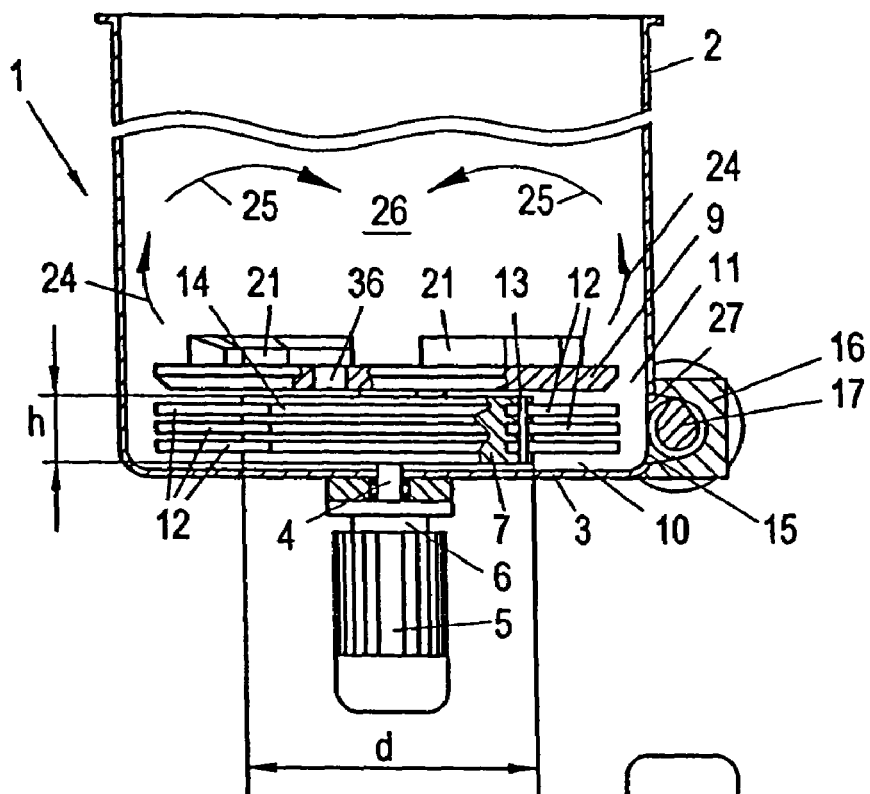
FIG. 1 is a vertical section through a first embodiment.
Figure 2:
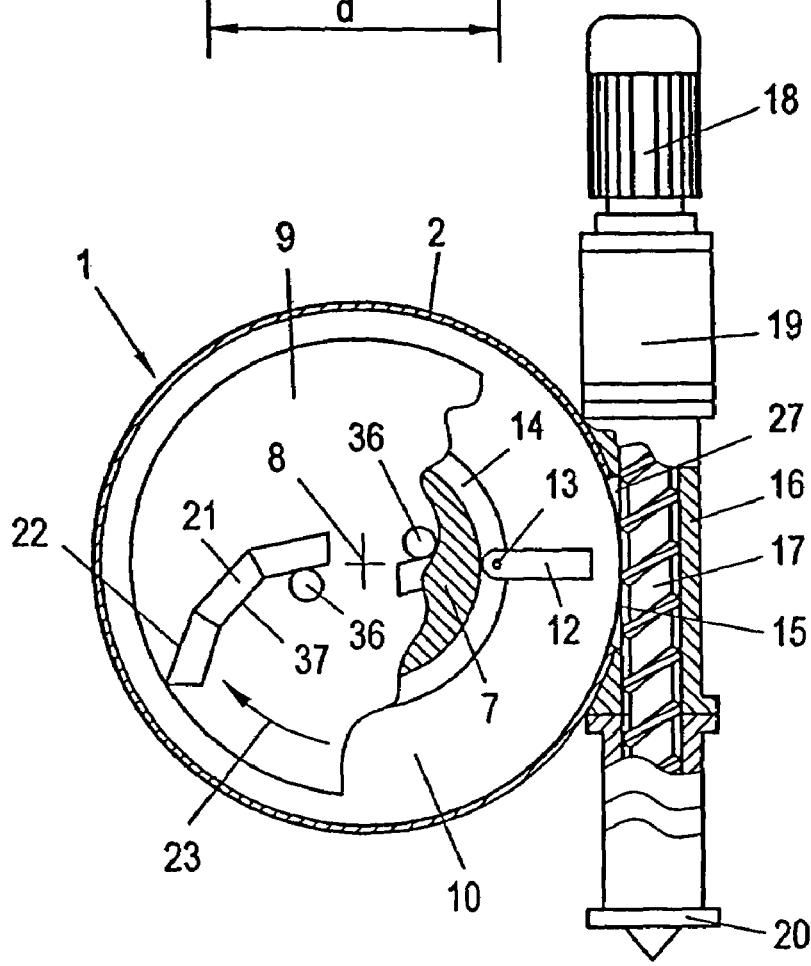
FIG. 2 is a plan view corresponding to FIG. 1, partly in section.

In the case of the embodiment according to FIGS. 1 and 2, the device has a receiving container 1 for the plastics material, in particular thermoplastic plastics material, which is to be treated and which is introduced into the container 1 from above by means of a conveyor device (not shown), for example a conveyor belt. The plastics material supplied can be crushed and/or dried beforehand. The receiving container 1 is in the shape of a cup with vertical lateral walls 2 and it has a flat base 3 of circular cross-section. A shaft 4, mounted in a sealed manner, passes through the base 3 and has a vertical axis 8 which coincides with the axis of the container. The shaft 4 is driven by a motor 5 arranged below the base 3 and having a gear 6 for rotational movement. In the container 1 a rotor 7 and a carrier disc 9 arranged above it are connected to the shaft 4 in a rotationally fixed manner. The rotor 7 is formed by a circular cylindrical block, the axial extension h of which is substantially greater than that of the flat carrier disc 9 but the radial extension d of which is substantially smaller than that of the carrier disc 9. In this way, a free space 10 is formed below the carrier disc 9 and communicates freely, with respect to flow for the treated material, with the space 26 situated above the carrier disc 9 in the container 1 by way of an annular gap 11 which is present between the periphery of the carrier disc 9 and the lateral wall 2 of the container 1. The treated plastics material can pass out of the space 26 through the free annular gap 11 into the annular space 10 without obstruction. The carrier disc 9 carries tools 21 which are arranged on its cover face in a fixed manner and which mix and/or crush and/or heat the material present in the space 26 in the container 1. For an effective crushing, the tools 21 are formed with cutter edges 22 which can be made curved or angled (FIG. 2), contrary to the direction of rotation of the carrier disc 9 (arrow 23), in order to produce a drawing cut.

In operation, a rotation of the plastics material introduced into the container 1 takes place during the rotation of the carrier disc on account of the influence of the tools 21, the treated material ascending along the lateral wall 2 of the container 1 in the space 26 (arrows 24) and dropping down again in the region of the axis of the container (arrows 25). The mixing cone formed in this way swirls the material introduced, so that a good mixing effect is achieved. A small proportion of the material introduced into the container 1 and, if necessary, crushed there passes through the annular gap 11 into the space 10 situated below the carrier disc 9, and there it is acted upon by further tools 12 which are fastened to the rotor 7 or to shaft 4 in a pivotable manner by means of vertical pins 13 in annular grooves 14 in the rotor 7, so that the tools can swing freely about the axes of the pins 13. The free ends of the tools 12 are situated at a distance from the lateral wall 2 of the container 1. On account of their beating action, these further tools 12 result in an additional mixing and/or crushing and/or heating of the material present in the space 10. Thus, the further tools form mixers only or, when fitted with cutters, as crushing tools. As a result of the centrifugal force exerted by the tools 12 upon the material, the material is conveyed into a discharge opening 15 in the container 1, which discharge opening 15 is situated at the height of the additional tools 12 and connects the space 10 in the container 1 to a feed opening 27 in a screw housing 16, in which a screw 17 is rotatably mounted. The screw 17 is driven at one of its end faces in a rotational manner by a motor 18 with a gear 19 and pushes out the plastics material supplied to it at the other end face, for example through an extruder head 20. It may be a single screw or a double screw. As may be seen, the screw housing 16 is attached substantially tangentially to the container, so that deflexions of the plastics material plasticized by the screw 17 in the region of its exit out of the housing 16 are prevented.

Instead, the screw 17 can also be a conveyor screw only, which conveys the material prepared in the container 1 on for further use, for example to an extruder.

In operation, after a brief start-up time a state of equilibrium is formed between the material removed by the worm and the material entering the space 10 from above through the annular gap 11. This has the result that it is highly improbable that a particle of plastics material introduced into the container 1 will arrive in the screw housing 16 without having first spent an adequate residence time in the container 1. This ensures that all the particles of plastics material are acted upon to a sufficient extent by the tools 12, 21, so that the material removed by the screw 17 has an at least approximately uniform nature, in particular with respect to the temperature and the size of the particles of plastics material. This means that the plasticization action to be exerted by the screw 17 or the attached extruder screw is comparatively low, so that high thermal peak stresses upon the plastics material during the plasticization action are eliminated. As a result, the plastics material is spared and considerable savings are made in driving energy for the screw 17 or the extruder screw respectively.

Figure 4:
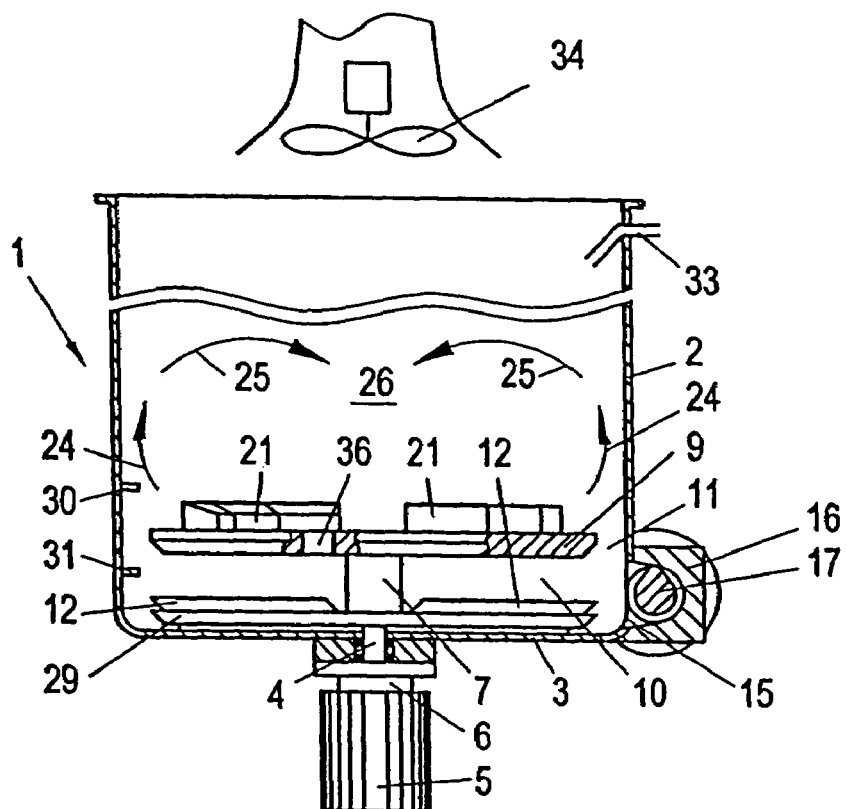
FIG. 4 shows a further embodiment in a vertical section.

As mentioned, the material introduced into the container 1 is not completely dry as a rule and/or it has impurities which, during the processing in the container, release volatile substances, for example water vapor, separation products from the treated material, evaporated coolant, volatile substances from inking and/or printing material, etc. In order to prevent the volatile substances from collecting in the space 10 below the carrier disc 9 and thus obstructing the passage of the treated material from the space 26 into the space 10 and/or penetrating into the interior of the screw housing 16, the carrier disc 9 has at least one aperture, and preferably a plurality of apertures 36, which connect the space 26 above the carrier disc 9 to the space 10 situated below it. As a result of the apertures 36, the volatile substances blocked-in in the space 10 can escape upwards through the carrier disc 9 and thus pass out of the container 1 or can be removed, for example by a suction means 34 (FIG. 4).

Figure 6:
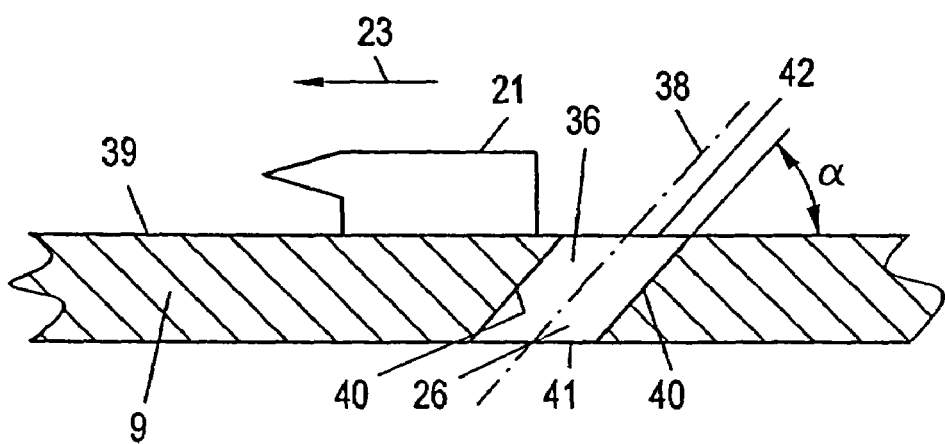
FIG. 6 shows a detail in a vertical section through the carrier disc.

These apertures can be formed by bores of circular cross-section. At least some of the apertures 36 are arranged close to the axis 8 of the container 1, namely immediately behind the tools 21, so that the apertures 36 are situated adjacent to the trailing edges 37 of the tools 21 as viewed in the direction of rotation (arrow 23) of the carrier disc 9. The suction effect produced by the tools 21 at their leading edges during their rotation assists the suction of the volatile substances upwards through the apertures 36. The axes of the apertures 36 can be arranged vertically, but it is more advantageous for the axes 38 to be arranged obliquely (FIG. 6), namely in such a way that they are inclined both with respect to the plane of the cover face 39 of the carrier disc 9 and with respect to the axis 8 of the container. The inclination of the walls 40 of the apertures (angle $\alpha$, FIG. 6) is advantageously between 30 and 60°, preferably approximately 45°. The inclination is selected to be such that the inlet end 41 of each aperture 36 is situated further forward than the outlet end 42 as viewed in the direction of rotation of the carrier disc 9 (arrow 23). This step too assists the suction effect already mentioned and tends to prevent the material from dropping directly out of the space 26 through the apertures 36 into the space 10.

Figure 3:
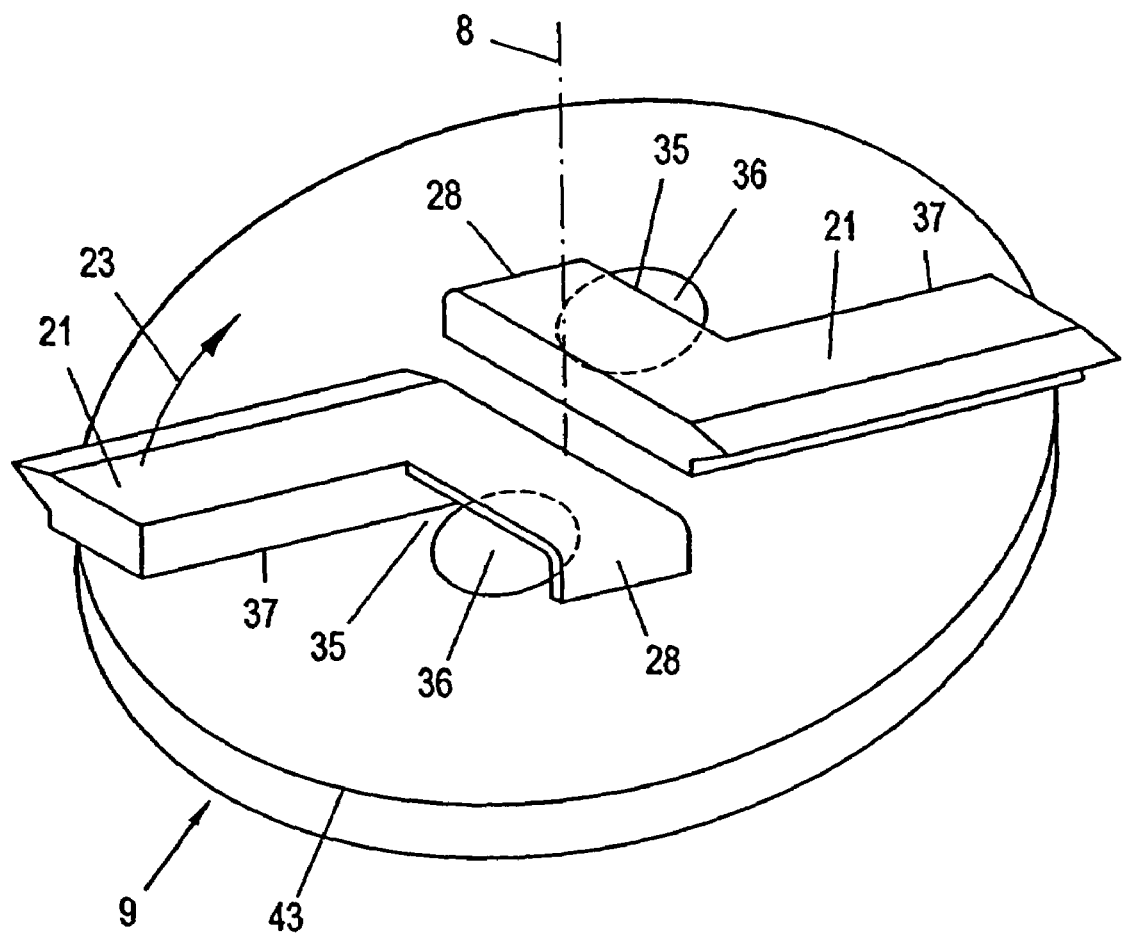
FIG. 3 shows axonometrically the design of covers for the apertures.

In addition, it is advantageous to provide the apertures or at least some of them with a cover 28 (FIG. 3) which covers the aperture 36 all around apart from an opening 35 directed outwards in the direction towards the periphery 43 of the carrier disc 9 or directed radially (with respect to the axis 8).

The size, i.e. the cross-sectional area of the apertures 36, depends upon the quantity of the volatile substances to be removed. As a rule, it is sufficient for the cross-sectional area of all the apertures 36 to be dimensioned as large as possible, such as the cross-sectional area of all the screws of the extruder connected with respect to flow to the discharge opening 15 of the container 1, or of the screws 17 respectively.

Figure 5:
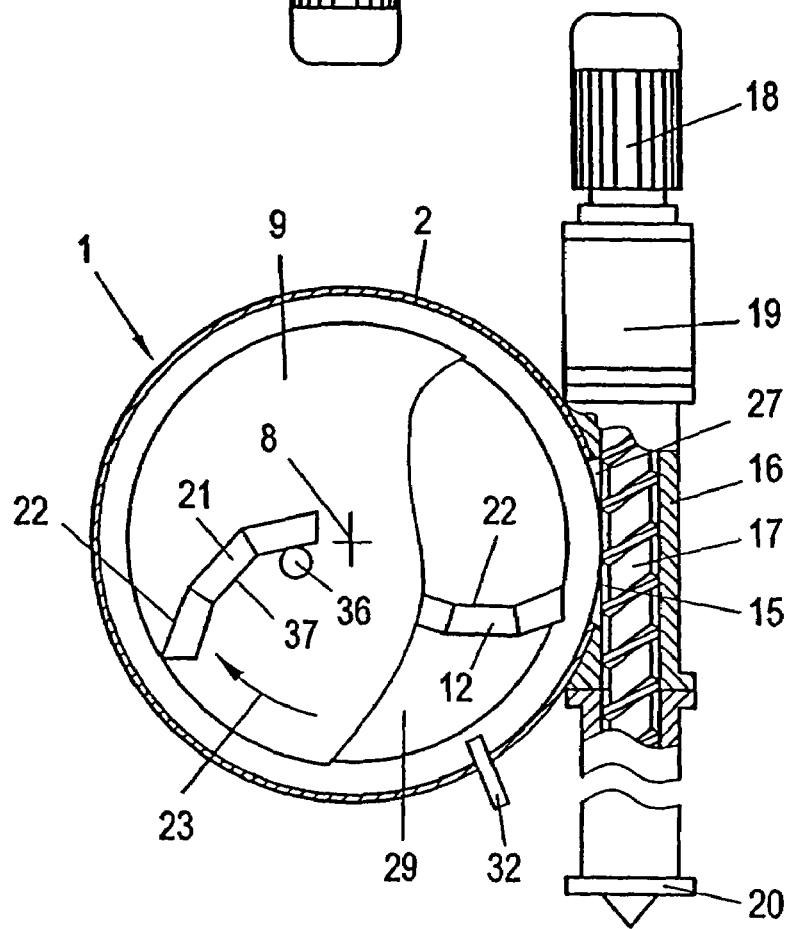
FIG. 5 is a plan view corresponding to FIG. 4, partly in section.

The embodiment according to FIGS. 4 and 5 differs from that according to FIGS. 1 and 2 above in that the further tools 12 are not suspended in a swinging manner, but are mounted rigidly on a further carrier disc 29 which is arranged coaxially with the carrier disc 9 and can be driven in a rotating manner by way of the same shaft 4. As a result, the rotor 7 can be made narrower or can be dispensed with entirely as an extension of the shaft 4. As in the case of the embodiment according to FIGS. 1 and 2, the lower tools 12 are arranged at the level of the discharge opening 15 in the container 1, in order to be able to convey the treated plastics material present in the space 10 into the feed opening 27 in the screw casing 16 in an effective manner.

It is advisable to monitor the temperature of the material treated in the container 1. To this end, as shown in FIG. 4, a temperature-measuring unit 30 and a cooling device 33 are provided in the upper cutter space 26 (above the carrier disc 9), it being possible for the cooling device 33 to be designed in the form of a coolant-spraying means. A similar temperature-measuring device 31 and a similar coolant supply 32 (FIG. 5) can be provided for the space 10 situated below the carrier disc 9.

As already mentioned, the removal of the volatile substances entering the upper cutter space 26 can be assisted by a suction means. To this end, it is possible, as shown in FIG. 4, for a suction device 34 to be provided above the mixing cone formed in the cutter space 26.

The invention claimed is:

1. A device for the preparation of plastics material, in particular thermoplastic plastics material, with a receiving container for the material to be treated, the interior of the said receiving container having tools provided therein which are arranged on a carrier disc and which are driven by a shaft inserted onto the interior for rotation about an axis of the shaft, and with at least one screw for removing the material out of the receiving container, wherein a screw housing has a feed opening which is connected with respect to flow to a discharge opening in the receiving container, which discharge opening is situated at a lower level than the carrier disc and the tools carried by it, and wherein further moved tools which convey the material into the discharge opening are provided in the receiving container below the carrier disc, wherein the carrier disc comprises at least one aperture which is situated close to the axis and close to trailing edges of the tools during the rotation of the carrier disc and which connects a space above the carrier disc to a space below it.

2. A device according to claim 1, wherein at least one of the apertures has walls which extend at an inclination to the direction of the axis and to the plane of the carrier disc.

3. A device according to claim 1, wherein at least one of the apertures has associated with is a cover which covers the aperture all round apart from an opening directed to towards the periphery of the carrier disc.

4. A device according to claim 1, wherein the apertures have a circular cross-section.

5. A device according to claim 1, wherein the cross-sectional area of all the apertures is at most as large as the cross-sectional area of the at least one screw of an extruder connected with respect to flow to the discharge opening.

6. A device according to claim 1, wherein the further moved tools situated in the space below the carrier disc mounted in at least one of a pivotable manner on at least one of the carrier disc and the shaft and a fixed manner on a further carrier disc situated below the carrier disc.

7. A device according to claim 6, wherein the further tools are constructed in the form of mixers only or, with cutters, as crushing tools.

8. A device according to claim 1, wherein a temperature-measuring device and a cooling device, is provided for the space above the carrier disc.

9. A device according to claim 1, wherein a temperature-measuring device and a cooling device, are provided for the space below the carrier disc.

10. A device according to claim 1, wherein a suction device for removing volatile substances is provided above a cone of material formed by rotating tolls in the receiving container.

11. A device according to claim 1 wherein the axis of the shaft is a vertical axis.

12. A device according to claim 8 wherein the device comprises a coolant spraying device.

13. A device according to claim 9 wherein the device comprises a coolant spraying device.

* * * * *